(12) United States Patent
Utz et al.

(10) Patent No.: US 7,779,726 B2
(45) Date of Patent: Aug. 24, 2010

(54) ADJUSTING DEVICE

(75) Inventors: Udo Utz, Ditzingen (DE); Ralf Kromer, Vaihingen (DE); Michael Knorpp, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 1022 days.

(21) Appl. No.: 11/515,888

(22) Filed: Sep. 6, 2006

(65) Prior Publication Data

US 2007/0068298 A1     Mar. 29, 2007

(30) Foreign Application Priority Data

Sep. 6, 2005    (DE) ................. 10 2005 042 202

(51) Int. Cl.
*F16H 57/02* (2006.01)
*F16H 57/04* (2006.01)
*F16H 61/00* (2006.01)
*F02D 9/08* (2006.01)

(52) U.S. Cl. .................... 74/606 R; 123/337

(58) Field of Classification Search .......... 403/1; 384/276, 296, 280, 416; 74/406, 409, 410, 74/412 R, 413, 421 A, 606 R; 123/337
See application file for complete search history.

(56) References Cited

U.S. PATENT DOCUMENTS

| | | | | |
|---|---|---|---|---|
| 4,688,420 A * | 8/1987 | Minagawa | ............... | 73/114.36 |
| 5,672,818 A | 9/1997 | Schaefer et al. | | |
| 5,934,143 A * | 8/1999 | Dibbern et al. | ............ | 74/421 A |
| 6,341,593 B2 * | 1/2002 | Kamimura et al. | .......... | 123/337 |
| 7,377,257 B2 * | 5/2008 | Utz et al. | .................... | 123/337 |
| 2001/0030518 A1* | 10/2001 | Reimann | ................... | 318/254 |
| 2005/0120998 A1* | 6/2005 | Kobayashi et al. | ......... | 123/399 |

FOREIGN PATENT DOCUMENTS

DE     19525510 A1     1/1997

* cited by examiner

*Primary Examiner*—Thomas R Hannon
*Assistant Examiner*—Justin Krause
(74) *Attorney, Agent, or Firm*—Ronald E. Greigg (57) ABSTRACT

In an adjusting device having a gear, high gear ratios are often demanded. High transverse forces often arise in the gear and must be intercepted by suitably dimensioned bearings. In the adjusting device proposed here, having a basic body and a cap, an embedded device is provided between a shaft, serving to support a gear wheel, and the cap. With the aid of the embedded device, good bearing of the gear wheel on both sides is attained, regardless of component tolerances. The adjusting device is intended especially for vehicles having an internal combustion engine.

19 Claims, 10 Drawing Sheets

ADJUSTING DEVICE

CROSS REFERENCE TO RELATED APPLICATIONS

This application is based on German Patent Application 10 2005 042 202.0 filed Sep. 6, 2005, upon which priority is claimed.

BACKGROUND OF THE INVENTION

1. Field of the Invention

The invention is directed to an improved adjusting device in which a control motor is employed to adjust a control element via a gear, and to a method of producing the device.

2. Description of the Prior Art

Adjusting devices for internal combustion engines exist in which a control motor is meant to adjust a final control element via a gear. Since there is often little installation space available for the adjusting device in a motor vehicle, care must be taken to assure a small structural size. To enable a relatively small control motor to adjust the final control element quickly and precisely, a gear is provided between the control motor and the final control element. Because of the tight space, the gear must be as small as possible.

German Patent Disclosure DE 195 25 510 A1 and U.S. Pat. No. 5,672,818 show an adjusting device provided in the intake tube of an internal combustion engine. This adjusting device has a throttle valve shaft, which is pivotably supported in a throttle valve housing and on which a throttle valve is secured. A gas conduit extends through the throttle valve housing. By pivoting of the throttle valve shaft, the throttle valve opens and closes the gas conduit. A control motor can adjust the throttle valve via a gear located in a gearbox and having a plurality of gear wheels. A middle gear wheel is supported rotatably on a shaft that is solidly joined to the basic body of the throttle valve housing. The gearbox is covered by a cap. Since among other elements, parts of a position sensor are mounted on the cap, the cap must be positioned very precisely in the region of the position sensor. For this reason, and because manufacturing variations can never be avoided entirely, there must be play in the region between the cap and the cap-side end, toward the cap, of the shaft, especially in the radial direction. The shaft can therefore be firmly held only in the region of the basic body, while in the region of the cap, only loose bearing with a great deal of play can be achieved. This has the disadvantage that particularly at the point where the shaft emerges from the basic body, the shaft is burdened by major bending stresses and shear stresses, and an especially high-strength material must therefore be used for the shaft, or else the shaft would be so thick that the entire device would have to be unnecessarily large.

OBJECTS AND SUMMARY OF THE INVENTION

The adjusting device and the method of the invention both have the advantage over the prior art that because of the embedded device, an excellent firm hold can be established between the cap and the shaft. A further advantage is that this firm hold can be established regardless of tolerances. This has the advantage that when the cap is being attached to the basic body, care need not be taken to position the cap precisely in the region of the shaft. This has the advantage that the cap can be positioned precisely in the region of other components, for instance in the region of a position sensor or rotary angle sensor. Thus the cap can be secured to the basic body exactly to suit the requirements for the position sensor or rotary angle sensor, without having to take the bearing of the shaft for the gear wheel into account in terms of tolerances. Because of the firm hold of the shaft in the region of the cap, there is the advantage that for a given load on the shaft by the gear wheel, the shaft can be made substantially thinner in comparison to previously known adjusting devices. Another advantage is that for a reasonable diameter of the shaft, the shaft can be manufactured from easily moldable material, making it possible to mold the shaft together with the basic body jointly from a single material.

If the embedded device is provided on the cap-side end, oriented toward the cap, of the shaft, so that this end of the shaft is well fixed relative to the cap, this has the advantage that the gear wheel supported on the shaft can be supported on both sides in a simple way, which prevents excessive sagging of the shaft and which facilitates the use of readily moldable material, even whenever the shaft has a relatively thin diameter.

If the embedded device has a relatively hard impressed body, which is attached to the shaft and formingly engages the cap as the cap is being joined to the basic body, this has the advantage that the embedded device on the cap molds integrally only when the cap is attached to the basic body, so that the cap can be produced with conventional, easily achieved tolerances.

If the impressed body is embodied in the form of a sleeve, this has the advantage that the adjusting device can be produced very simply, because of the circumstance of the very simple, economical capability of producing a sleeve, even in large mass-production numbers.

If the sleeve has a reduced diameter toward the cap, then this has the advantage that in the longitudinal direction to the shaft the sleeve can be positioned very simply on the shaft, and it has the further advantage that because of the reduced diameter, the forces for impressing it into the cap are reduced.

If a rib is provided on the cap, this has the advantage that this rib can serve as material for the impressing by the impressed body, and on the far side of the rib, material can be cut out, which reduces the force for impressing into the cap to a readily manageable amount. If a plurality of ribs are provided, into which the impressed body must impress as the cap is being attached to the basic body, this has the advantage that the volume to be positively displaced per penetration point is slight, so that for the cap, even a material that is not so readily deformable can be used.

The rib has a further advantage in that it can be oriented such that it extends along the direction of the force with which the gear wheel acts on the shaft, so that with little use of material and with only slight required impressing forces, good fixation of the shaft relative to the cap can be achieved.

If the sleeve is used for supporting the gear wheel on the shaft, then without additional effort or expense, a good improvement to the bearing of the gear wheel on the shaft is obtained.

BRIEF DESCRIPTION OF THE DRAWINGS

The invention will be better understood and further objects and advantages thereof will become more apparent from the ensuing detailed description of a preferred embodiment, taken in conjunction with the drawings, in which.

DESCRIPTION OF THE PREFERRED EMBODIMENTS

The adjusting device of the invention can be used in various places in internal combustion engines, in particular for controlling a passage through a gas conduit. The gas conduit is intended for instance for a flow of air or a fuel-air mixture or for controlling exhaust gas, and so forth. Depending on the pivoted position of the throttle valve, the flow of gas is throttled to a greater or lesser degree. Normally, the throttle valve can be pivoted by up to 90°. However, embodiments also exist in which the throttle valve can be pivoted by only less than 90° or by more than 90°, for instance by up to 180°. The throttle valve shaft with the throttle valve can be pivoted with the aid of a control motor, for instance. The control motor engages the throttle valve shaft, for instance by way of at least one gear wheel.

In all the drawings, elements that are the same or function the same are provided with the same reference numerals. Unless otherwise mentioned or shown in the drawing, what is said and shown for one of the drawings applies to the others as well. As long as nothing else is said in the explanations, the various details can be combined with one another.

Figure 1:
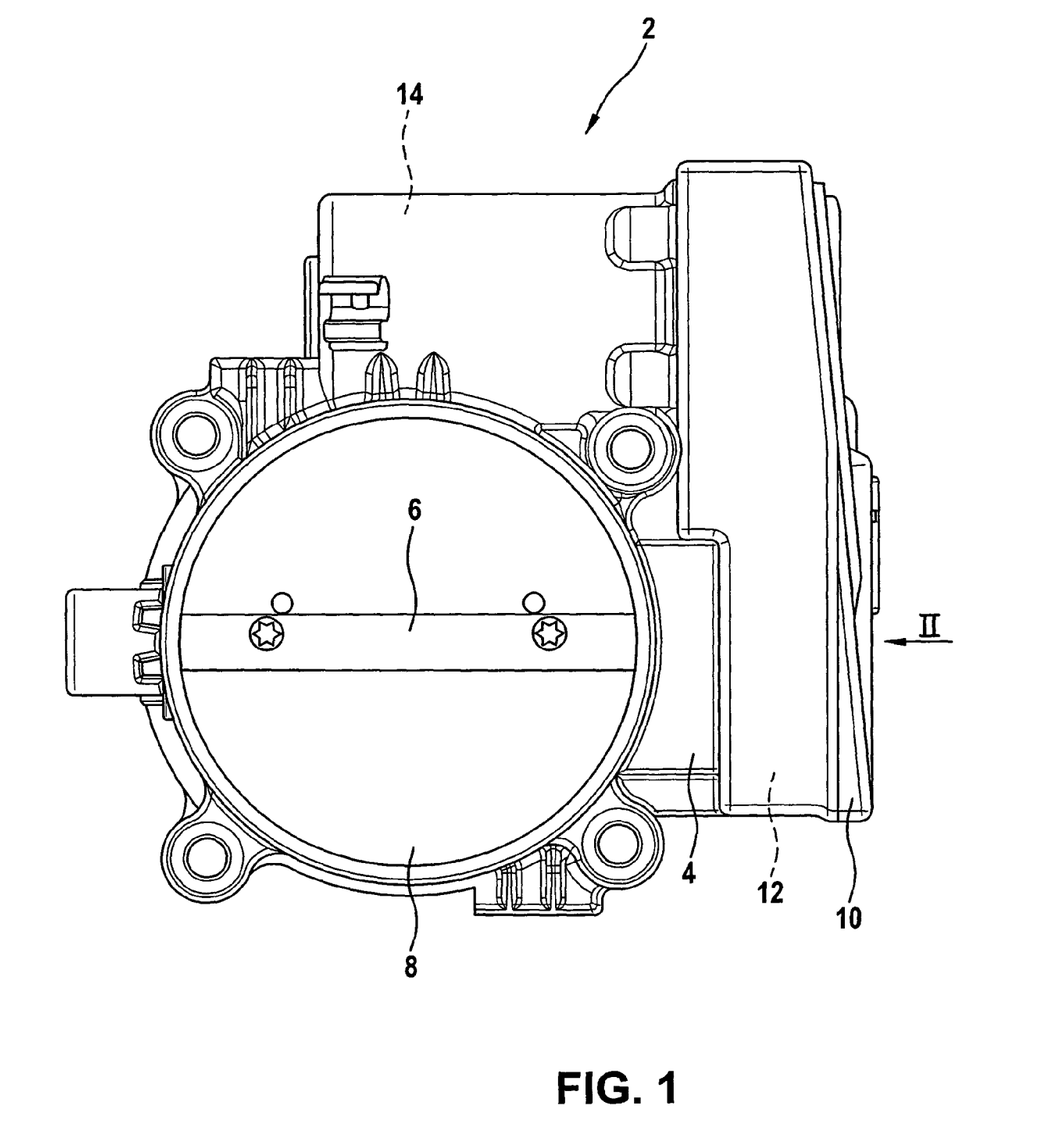
FIG. 1 shows a top view on an adjusting device according to the invention.

FIG. 1 shows an adjusting device 2 with a basic body 4, a throttle valve shaft 6, a throttle valve 8, and a cap 10. Inside the adjusting device 2, there is a gearbox 12. The gearbox 12 is enclosed by the basic body 4, side walls of the basic body 4, and the cap 10. Inside the basic body 4, there is also a control motor 14. Since in FIG. 1 the gearbox 12 and the control motor 14 are covered by the basic body 4 and the cap 10, respectively, and are thus not directly visible, the reference lines for reference numerals 12 and 14 are shown as dashed lines.

Inside the gearbox 12 is a gear train 16 (FIG. 2), with a motor pinion 18, a gear wheel 20, and a power takeoff wheel 22. Since in the viewing direction selected for FIG. 2 the motor pinion 18, gear wheel 20 and power takeoff wheel 22 are covered by the cap 10, these parts are represented by dashed lines in FIG. 2.

In the manufacture of the adjusting device 2, once the control motor 14 and the gear 16 have been built in, the cap 10 is mounted on the basic body 4. In the finished state, the circumference of the cap 10 is solidly welded, glued, or firmly held with clamps to the basic body 4.

Figure 2:
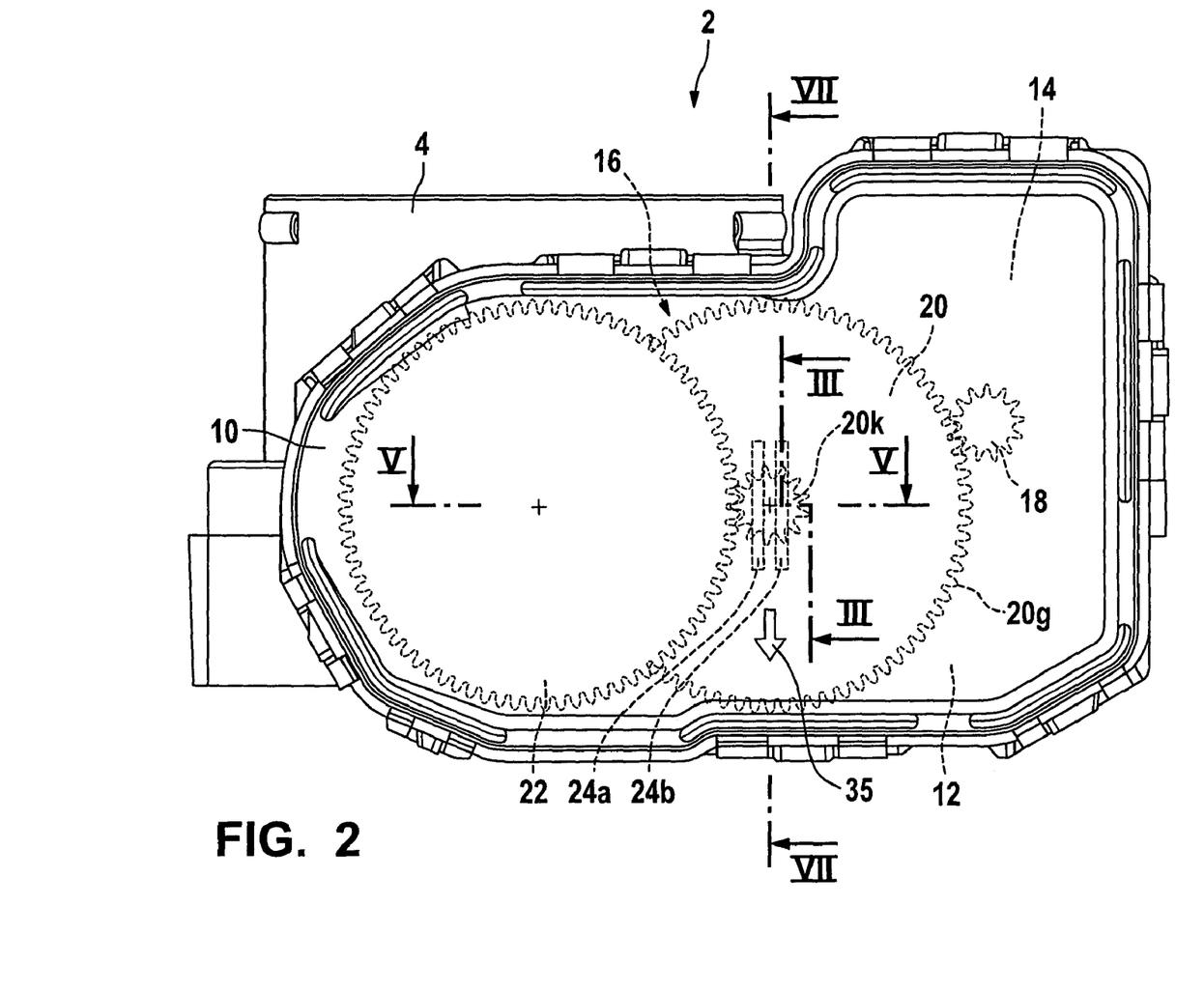
FIG. 2 is a side view of the adjusting device shown in FIG. 1.

On the cap 10, a first rib 24a and a second rib 24b are provided (FIG. 2). Since the ribs 24a and 24b are located on the cap 10 on the side of the cap 10 facing away from the observer, the ribs 24a and 24b in FIG. 2 are represented by dashed lines.

Figure 3:
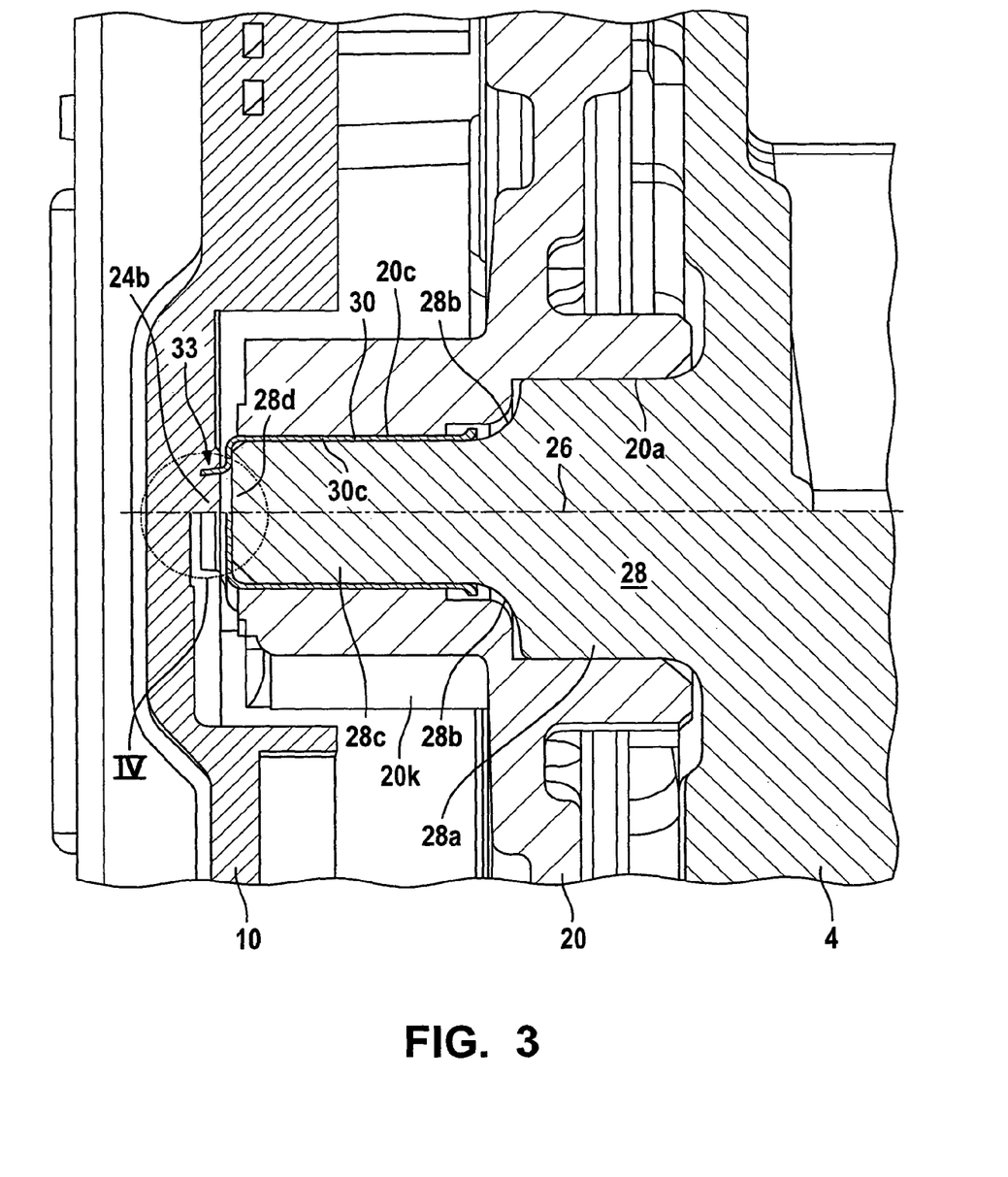
FIG. 3 is an enlarged, fragmentary section through a portion of section through the adjusting device.
Figure 5:
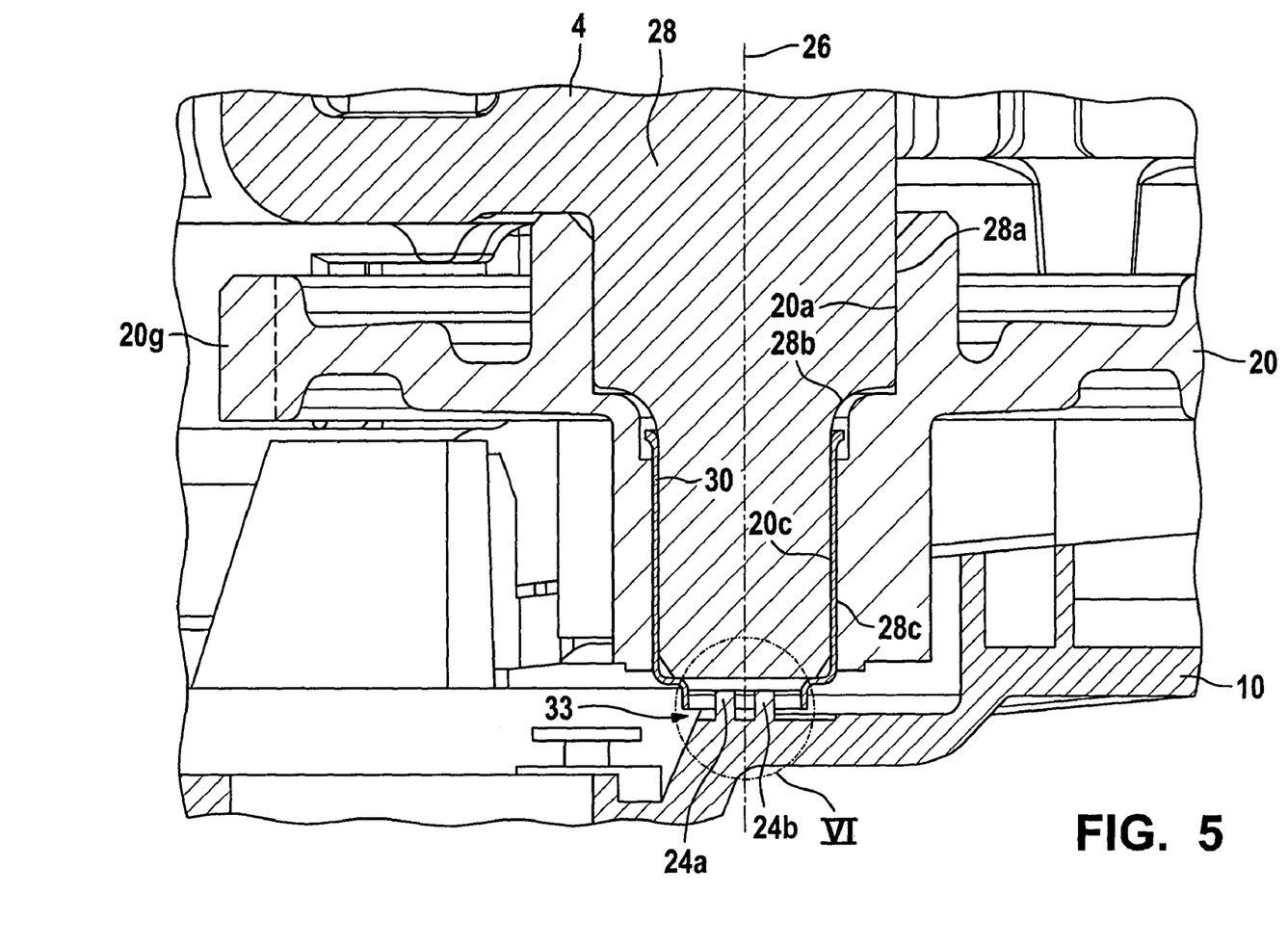
FIG. 5 is an enlarged section taken along line V-V of FIG. 2 the adjusting device.
Figure 6:
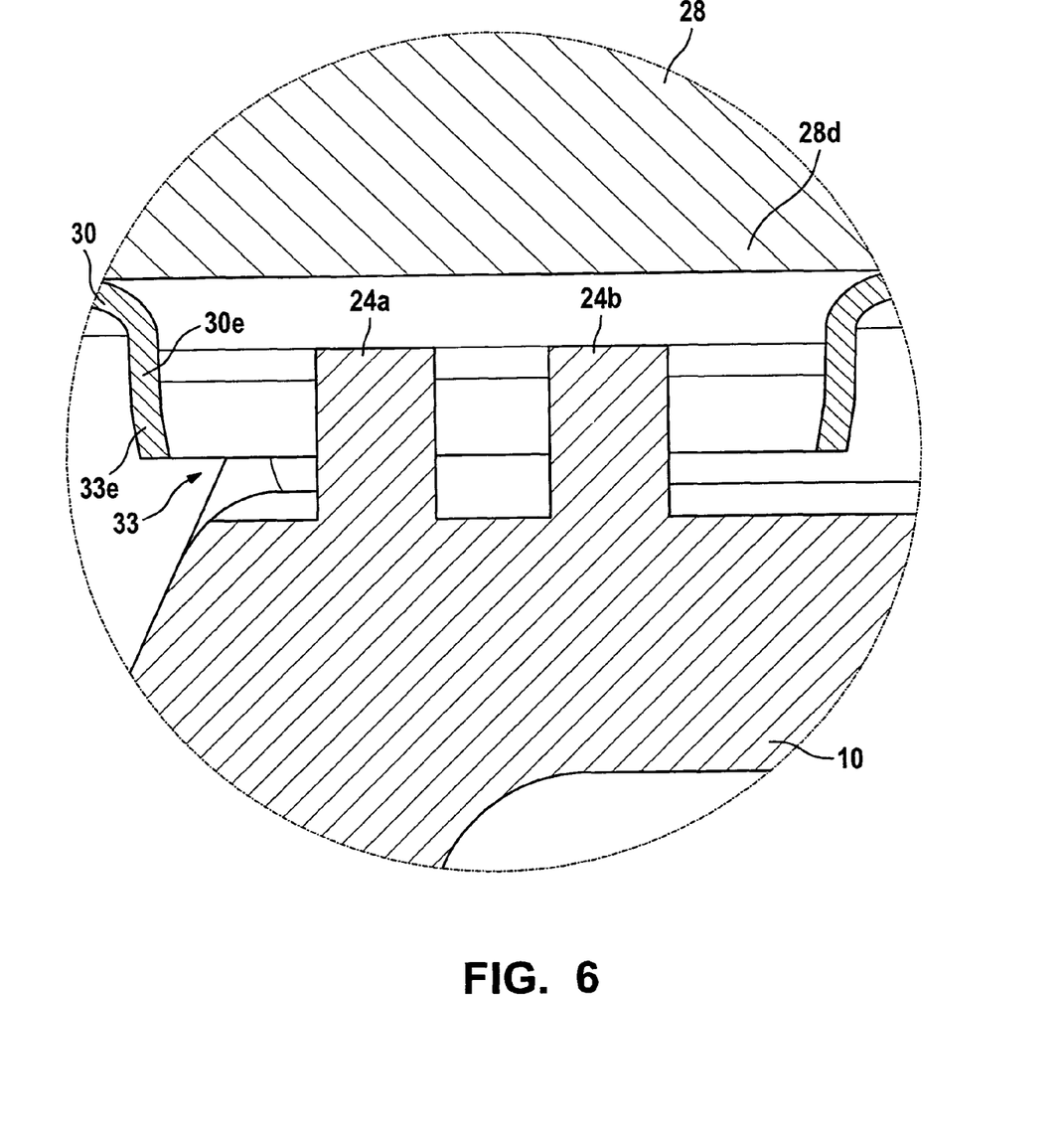
FIG. 6 is a further enlarged detail designated VI in FIG. 5.
Figure 7:
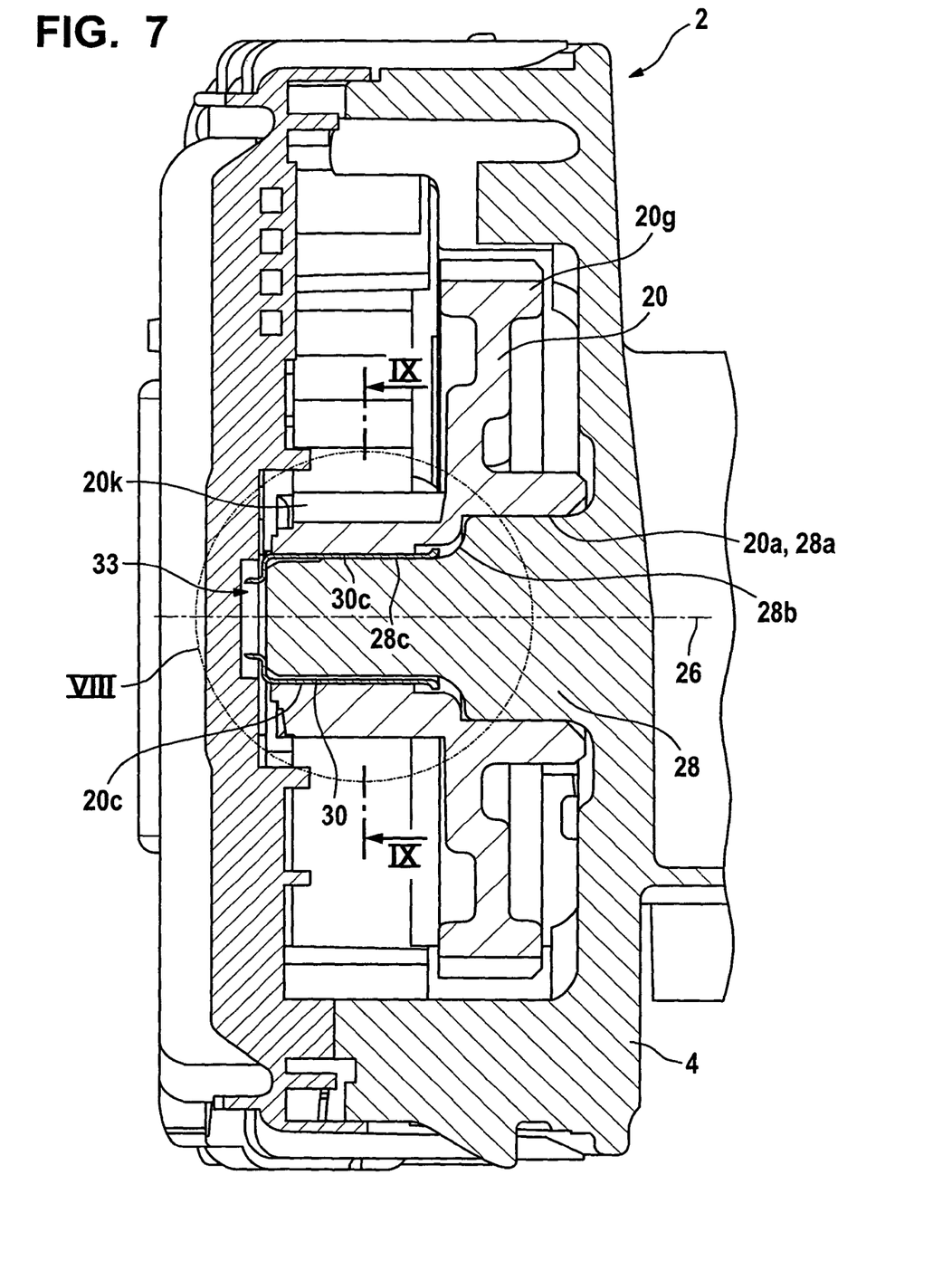
FIG. 7 shows a further section, taken along line VII-VII in FIG. 2, through the adjusting device.

A shaft 28 is integrally molded onto the basic body 4 (FIGS. 3, 5, 7). In the especially advantageous exemplary embodiment that is preferably selected, the basic body 4 and the shaft 28 are molded from the same plastic, for instance by injection molding. However, the shaft 28 may also be a separate material, which is joined to the basic body 4 for instance via a press fit. Because of the invention proposed here, in which the load on the shaft 28 is reduced markedly compared to known adjusting devices, it is easily possible to make the shaft 28 and the basic body 4 from the same plastic.

The shaft 28 has different diameters, viewed along its axial direction. Beginning at the basic body 4, the shaft 28 first has a larger shaft diameter 28a, and with increasing distance from the basic body 4, it has a smaller shaft diameter 28c. In a transition region 28b, the larger shaft diameter 28a merges with the smaller shaft diameter 28c. On the side facing away from the basic body 4, the shaft 28 has a cap-side end 28d on its face end.

The gear wheel 20 is rotatably supported on the shaft 28. The gear wheel 20 has one region with a larger inside diameter 20a and another region with a smaller inside diameter 20c (FIGS. 3, 5 and 7).

The gear wheel 20 is rotatably supported on the larger shaft diameter 28a via the larger inside diameter 20a and on the smaller shaft diameter 28c via the smaller inside diameter 20c. It is also possible to provide more than two different diameter steps, so that the shaft 28, beginning at the basic body 4, becomes increasingly thinner in a plurality of stages in a more or less finely graduated way, and the inside diameters of the gear wheel 20 are adapted to suit the diameters of the shaft 28.

Figure 4:
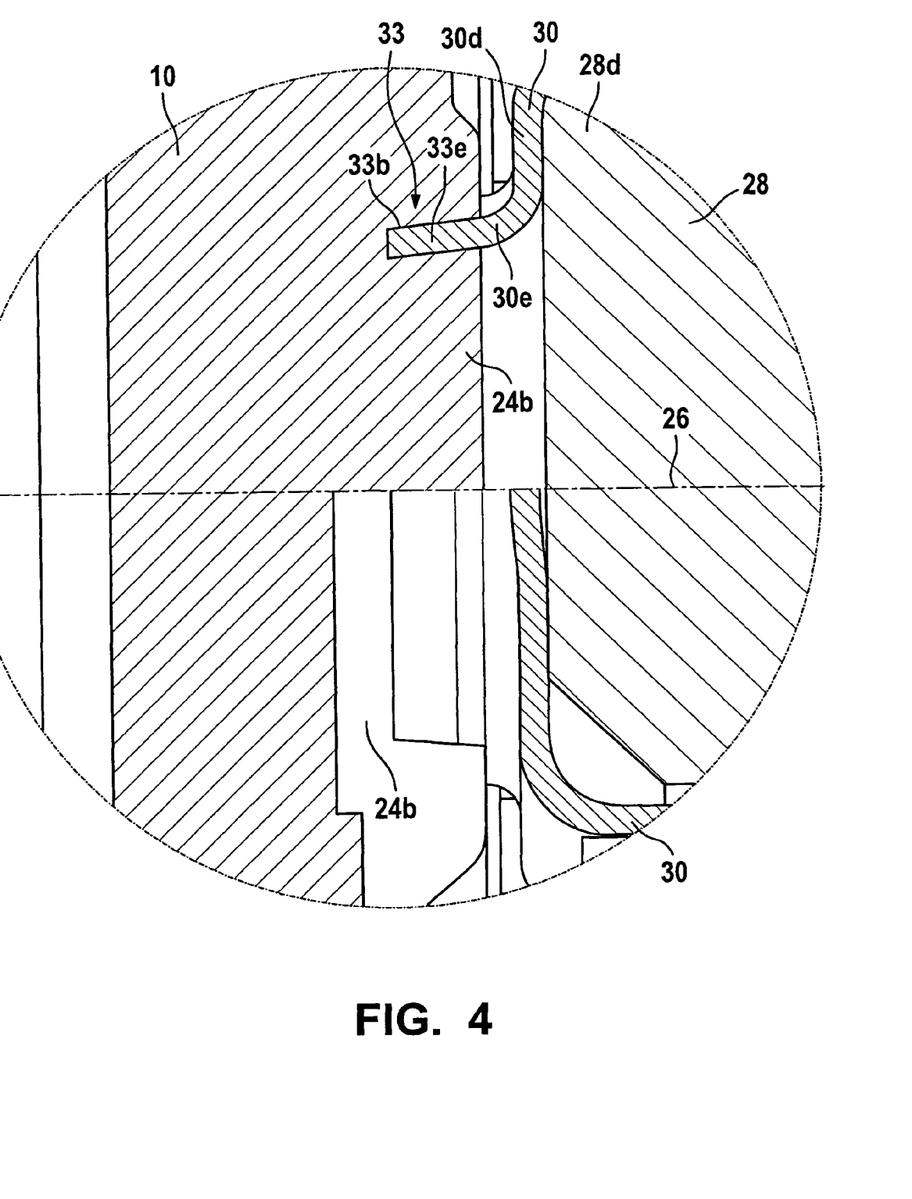
FIG. 4 shows a further enlarged detail designated IV in from FIG. 3.
Figure 8:
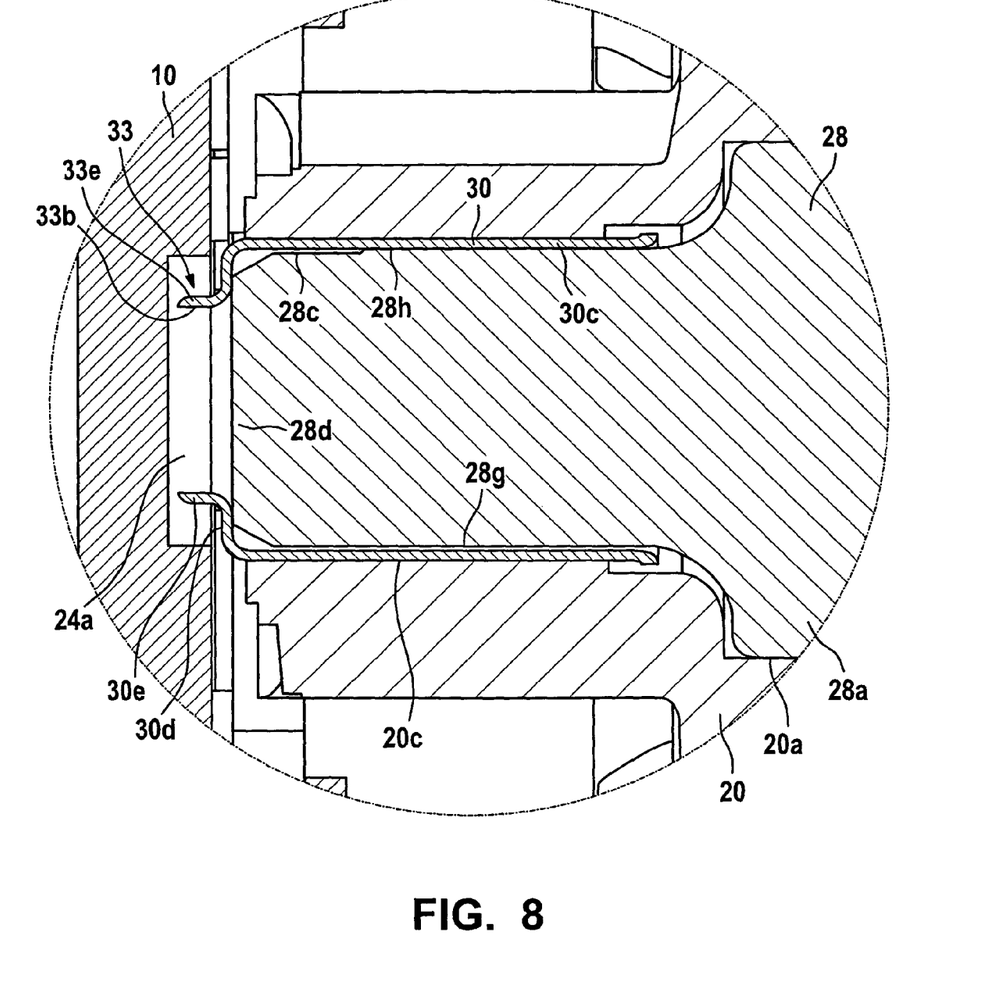
FIG. 8 shows a further enlarged detail designated VIII in FIG. 7.
Figure 9:
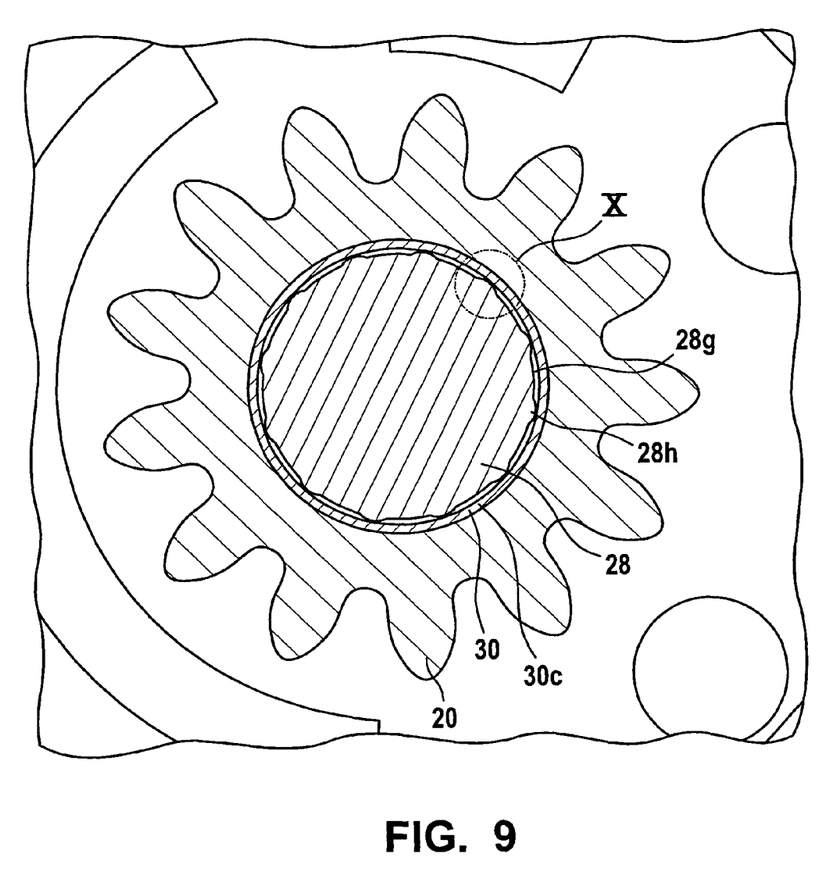
FIG. 9 is a section through the gear wheel transversely to the shaft.

A sleeve 30 is located on the shaft 28. The sleeve 30 surrounds the smaller shaft diameter 28c of the shaft 28. The sleeve 30 is pressed onto the shaft 28. The sleeve 30 protrudes in the axial direction past the cap-side end 28d of the shaft 28. The sleeve 30 has a first region 30c which is pressed onto the smaller shaft diameter 28c of the shaft 28. At the place where the sleeve 30 protrudes past the cap-side end 28d, the sleeve 30 has a diameter step 30d (FIG. 8). This is adjoined, with reduced diameter, by a second region 30e. The second region 30e of the sleeve 30, beginning at the diameter step 30d, extends axially in the direction of the cap 10. The sleeve 30, or at least the second region 30e of the sleeve 30, or at least the axially protruding edge of the second region 30e of the sleeve 30, comprises relatively hard or hardened material, and the wall thickness of the second region 30e is relatively thin and preferably tapers to a point or to a knife edge at the end. When the cap 10 is joined to the basic body 4, the second region 30e of the sleeve 30 presses into the ribs 24a and 24b provided on the cap 10. As a result, the sleeve 30 together with the cap 10 form an embedded device 33 as best seen in FIG. 4. The second region 30e of the sleeve 30 acts as an impressed body 33e of the embedded device 33, and the ribs 24a and 24b of the cap 10 act as a receptacle region 33b for the impressed body 33e of the embedded device 33. It is pointed out that FIG. 3 shows a section through the adjusting device along the sectional plane marked III-III in FIG. 2. The sectional plane is stepped in the region of the pivot axis 26 of the gear wheel 20. In the region above the pivot axis 26, the sectional plane III-III extends through the rib 24b, and below the pivot axis 26, the sectional plane III-III extends to the right of the rib 24b. The viewing direction of the sectional plane III-III shown is marked with arrows III in FIG. 2.

The embedded device 33 is designed such that the relatively hard impressed body 33e presses into the receptacle 33b while the cap 10 is being mounted on the basic body 4. Since the receptacle 33b is not integrally molded on until during the mounting of the cap 10 onto the basic body 4, an exact positioning is obtained between the shaft 28 and the cap 10, regardless of dimensional tolerances of the cap 10 and/or of the basic body 4.

The gear wheel 20 has one larger ring gear 20g and one smaller ring gear 20k (FIGS. 2 and 7). The larger ring gear 20g meshes with the motor pinion 18 (FIG. 2), and the smaller ring gear 20k meshes with the power takeoff wheel 22. Depending on the torque to be transmitted, the gear wheel 20 loads the shaft 28, transversely to the pivot axis 26, with a transverse force indicated by the arrow 35. The direction of this transverse force 35 onto the shaft 28 is substantially perpendicular to the connecting line between the pivot axis 26 of the gear wheel 20 and the pivot axis of the power takeoff wheel 22. The direction of the transverse force 35 also depends somewhat on the pivot axis of the motor pinion 18, but this influence is relatively slight. In FIG. 2, the arrow 35 is meant to roughly symbolize the direction of the transverse force 35. Depending on the rotational direction of the torque, the direction of the transverse force 35 may also be oriented counter to the arrow. The transverse force 35 is especially great if, when the throttle valve 8 is being adjusted rapidly (FIG. 1), the throttle valve 8 strikes an end stop.

The ribs 24a and 24b on the cap 10 offer the advantage that the impressed body 33e of the embedded device 33 need not dig into the cap 10 over the entire circumference of the second region 30e of the sleeve 30, but instead has to dig into only parts of the circumference of the second region 30e of the sleeve 30.

Instead of the two ribs 24a and 24b, it is also possible for only one rib 24a to be provided. It is equally possible to provide three or more ribs, however. It is also possible to make the cap 10 without ribs and to design it such that the impressed body 33e on the shaft 28 presses directly into the inside of the cap 10, oriented toward the gearbox 12, and the receptacle 33b of the embedded device 33 is formed there on the cap 10.

The at least one rib 24a, or the ribs 24a and 24b, are preferably oriented such that they extend parallel to the direction of the transverse force 35 acting from the gear wheel 20 onto the shaft 28 (FIG. 2). The lengths of the ribs 24a and 24b are dimensioned such that the impressed body 33e, formed by the second region 30e of the sleeve 30, penetrates each of the ribs 24a, 24b at two points each spaced apart from one another. As a result, the receptacle 33b extends in the ribs 24a and 24b transversely to the direction of the transverse force 35, so that when the transverse force 35 occurs, this transverse force 35 can be optimally absorbed by the cap 10. As a result, a good hold between the cap 10 and the shaft 28 is achieved with a relatively short receptacle 33b. The short receptacle 33b has the advantage that the impressed body 33e of the embedded device 33 can be impressed into the receptacle 33b with relatively little force.

Figure 10:
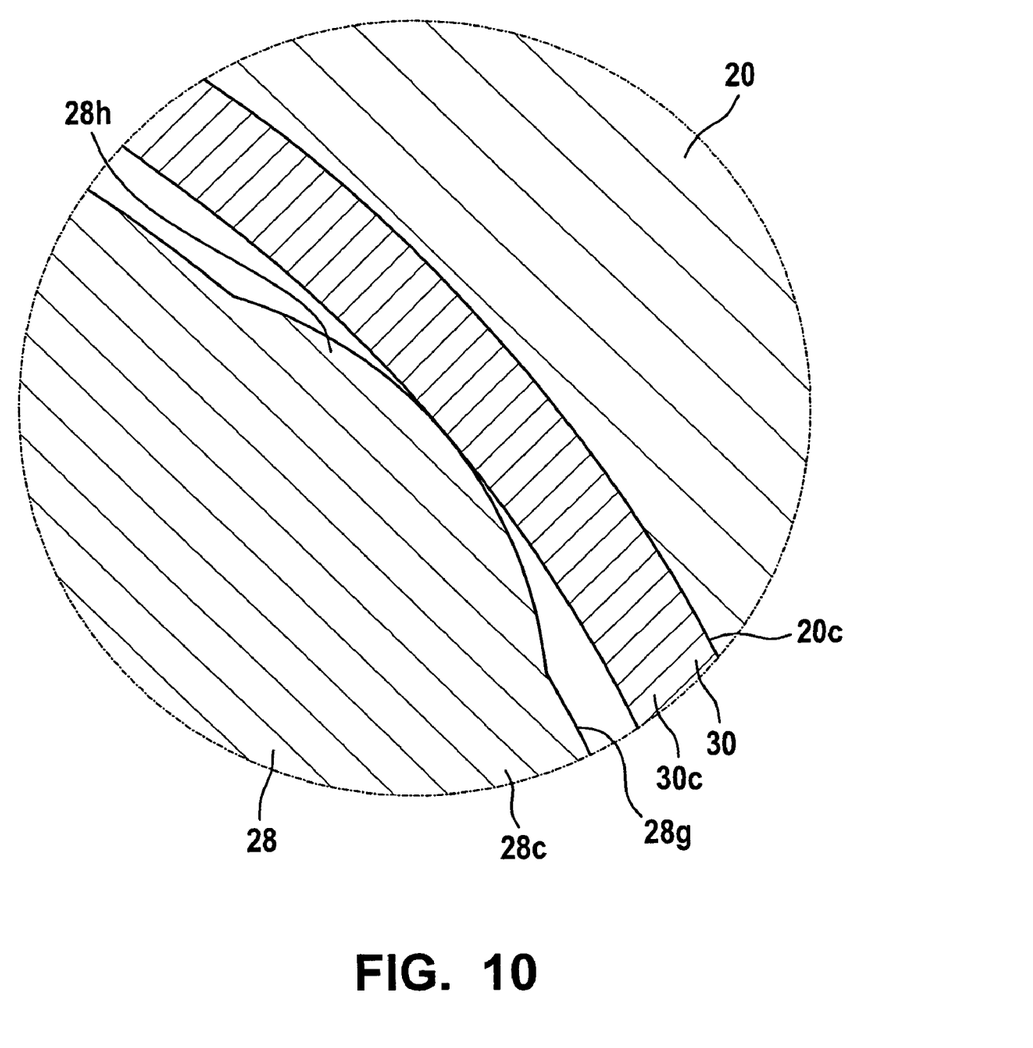
FIG. 10 shows a further enlarged detail designated X in FIG. 9.

At the place where the sleeve 30 is pressed on, or in other words in the exemplary embodiment shown at the smaller shaft diameter 28c, the shaft 28 has a basic diameter 28g (FIGS. 8 and 10). On the circumference of the basic diameter 28g, it has a protuberance 28h, or a plurality of protuberances 28h distributed more or less uniformly over the circumference. The basic diameter 28g with the protuberances 28h has a circular outline. The circular outline is the smallest possible circle into which the basic diameter 28g would fit, including the protuberances 28h, without being pressed. It is proposed that the circular outline of the basic diameter 28g with the protuberances 28h be selected as larger than the inside diameter of the region 30c of the sleeve 30, yet the basic diameter 28g, without taking the protuberances 28h into account, is smaller than the inside diameter of the region 30c of the sleeve 30. As a result, the region 30c of the sleeve 30 can be pressed onto the shaft 28 with relatively little force and with relatively little deformation of the material comprising the shaft 28.

As the sleeve 30 is being pressed onto the shaft 28, only the tips in the region of the protuberances 28h have to be deformed slightly. This offers the advantage that for the shaft 28, a material that is relatively difficult to deform later can be used. A further advantage is that because of the protuberances 28h, the sleeve 30 is somewhat deformed elastically, creating an initial tension that reliably holds the sleeve 30 firmly on the shaft 28.

The gear wheel 20 is seated, in the region of the large ring gear 20g having the larger inside diameter 20a, on the larger shaft diameter 28a of the shaft 28 (FIGS. 5 and 7). The large ring gear 20g is rather large, so that the larger shaft diameter 28a can also be dimensioned as relatively large. This offers the advantage that the load acting on the shaft 28 because of the transverse force 35 can be absorbed relatively easily by the shaft 28.

The gear wheel 20 is seated, in the region of the small ring gear 20k having the smaller inside diameter 20c, on the first region 30c of the sleeve 30 and thus indirectly on the smaller shaft diameter 28c of the shaft 28. Because of the reduction in the diameter of the shaft 28 in the transitional region 28b, the advantage is obtained that the small ring gear 20k can be selected to be rather small, which makes a high gear ratio possible between the gear wheel 20 and the power takeoff wheel 22 (FIG. 2).

To obtain as high a gear ratio as possible between the gear wheel 20 and the power takeoff wheel 22, the small ring gear 20k of the gear wheel 20 should be relatively small. Since with greater distance from the basic body 4 the shaft 28 has the smaller shaft diameter 28c, the small ring gear 20k of the gear wheel 20 can be kept rather small, as desired.

By means of the embedded device 33 between the shaft 28 and the cap 10, the advantage is obtained that the shaft 28 is held directly by the basic body 4 on one end and by the cap 10 in an excellent way on the other end. Since the cap 10 is firmly held by the basic body 4 in a highly nondisplaceable manner, the result is good bearing on both sides of the gear wheel 20 on the shaft 28 and as a result on the basic body 4.

If the sleeve 30 surrounds only the smaller shaft diameter 28c of the shaft 28, then this offers advantages because of reduced tolerance problems and reduced forces required for pressing the sleeve on, and where the load between the gear wheel 20 and the shaft 28 is especially great, or in other words at the smaller shaft diameter 28c, a distribution of the load per unit of surface area on the shaft 28 is obtained.

The foregoing relates to a preferred exemplary embodiment of the invention, it being understood that other variants and embodiments thereof are possible within the spirit and scope of the invention, the latter being defined by the appended claims.

We claim:

1. An adjusting device, in particular for an internal combustion engine, the adjusting device comprising;
   a basic body;
   a cap that is connectable to the basic body;
   a gearbox between the cap and the basic body;
   a gear with at least one gear wheel, the gear wheel being located at least partly in the gearbox;
   a shaft having one end portion connected in a fixed manner to the basic body, the shaft rotatably supporting the gear wheel; and
   an embedded device connecting the shaft and the cap, which becomes embedded in the cap when the cap is joined to the basic body and which fixes at least one region of the shaft relative to the cap at least in a transverse direction, and further fixes the at least one region of the shaft relative to the cap in a rotational direction.

2. The adjusting device as defined by claim 1, wherein the embedded device is located essentially on an end of the shaft oriented toward the cap and wherein the embedded device fixes the end of the shaft oriented toward the cap relative to the cap.

3. The adjusting device as defined by claim 2, wherein the embedded device comprises an impressed body of hardened material attached to the shaft and which formingly engages the cap as the cap is being joined to the basic body.

4. The adjusting device as defined by claim 3, wherein the impressed body comprises a sleeve which surrounds the shaft at least some regions of the shaft.

5. The adjusting device as defined by claim 4, wherein the sleeve has a smaller diameter at an end of the sleeve oriented toward the cap than at an end of the sleeve oriented away from the cap.

6. The adjusting device as defined by claim 2, further comprising at least one rib on the cap, the at least one rib facilitating embedding of the embedding device in the cap when the cap is joined to the basic body.

7. The adjusting device as defined by claim 6, wherein the at least one rib is oriented essentially parallel to a gear force acting on the gear wheel.

8. The adjusting device as defined by claim 1, wherein the embedded device comprises an impressed body of hardened material attached to the shaft which formingly engages the cap as the cap is being joined to the basic body.

9. The adjusting device as defined by claim 8, further comprising at least one rib on the cap, the at least one rib facilitating embedding of the embedding device in the cap when the cap is joined to the basic body.

10. The adjusting device as defined by claim 9, wherein the at least one rib is oriented essentially parallel to a gear force acting on the gear wheel.

11. The adjusting device as defined by claim 8, wherein the impressed body comprises a sleeve which surrounds the shaft at least some regions of the shaft.

12. The adjusting device as defined by claim 11, further comprising at least one rib on the cap, the at least one rib facilitating embedding of the embedding device in the cap when the cap is joined to the basic body.

13. The adjusting device as defined by claim 11, wherein the sleeve reinforces the support of the gear wheel on the shaft.

14. The adjusting device as defined by claim 13, wherein the gear wheel is supported at least partially on the sleeve.

15. The adjusting device as defined by claim 11, wherein the sleeve has a smaller diameter at an end of the sleeve oriented toward the cap than at an end of the sleeve oriented away from the cap.

16. The adjusting device as defined by claim 15, wherein the sleeve reinforces the support of the gear wheel on the shaft.

17. The adjusting device as defined by claim 16, wherein the gear wheel is supported at least partially on the sleeve.

18. The adjusting device as defined by claim 1, further comprising at least one rib on the cap, the at least one rib facilitating embedding of the embedding device in the cap when the cap is joined to the basic body.

19. The adjusting device as defined by claim 18, wherein the at least one rib is oriented essentially parallel to a gear force acting on the gear wheel.

* * * * *